United States Patent
McCorkendale et al.

(10) Patent No.: US 10,210,347 B2
(45) Date of Patent: Feb. 19, 2019

(54) TECHNIQUES FOR MANAGING PRIVACY OF A NETWORK COMMUNICATION

(71) Applicant: Symantec Corporation, Mountain View, CA (US)

(72) Inventors: Bruce E. McCorkendale, Manhattan Beach, CA (US); William E. Sobel, Jamul, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 34 days.

(21) Appl. No.: 14/745,826

(22) Filed: Jun. 22, 2015

(65) Prior Publication Data
US 2016/0371508 A1 Dec. 22, 2016

(51) Int. Cl.
H04L 29/00 (2006.01)
G06F 21/62 (2013.01)
H04L 29/06 (2006.01)

(52) U.S. Cl.
CPC ...... *G06F 21/6263* (2013.01); *G06F 21/6254* (2013.01); *H04L 63/0272* (2013.01); *H04L 63/0421* (2013.01); *H04L 63/20* (2013.01); H04L 63/0428 (2013.01); H04L 63/18 (2013.01)

(58) Field of Classification Search
CPC .. G06F 21/6263; G06F 21/6254; G06F 21/00; G06F 21/10; G06F 21/121; G06F 21/125; G06F 21/128; H04L 63/0272; H04L 63/0428; H04L 63/20; H04N 21/44236; G11B 20/00086
See application file for complete search history.

(56) References Cited

U.S. PATENT DOCUMENTS

| | | | |
|---|---|---|---|
| 6,266,704 B1* | 7/2001 | Reed | H04L 45/00 709/238 |
| 8,893,254 B1 | 11/2014 | Khanfar et al. | |
| 2004/0223497 A1* | 11/2004 | Sanderson | H04L 12/4641 370/395.52 |
| 2009/0158430 A1* | 6/2009 | Borders | G06F 21/552 726/23 |
| 2009/0217351 A1* | 8/2009 | Burch | H04L 63/0281 726/3 |

(Continued)

OTHER PUBLICATIONS

International Search Report and Written Opinion issued by the U.S. Patent and Trademark Office as Searching Authority issued in International Application No. PCT/US16/36807, dated Aug. 31, 2016 (10 pages).

(Continued)

*Primary Examiner* — Brandon S Hoffman
*Assistant Examiner* — Helai Salehi
(74) *Attorney, Agent, or Firm* — Meyertons Hood Kivlin Kowert and Goetzel PC; Rory D. Rankin

(57) ABSTRACT

Techniques for managing privacy of a network communication may be realized as a computer-implemented system, including one or more processors that store instructions, and one or more computer processors that execute the instructions to receive a first network communication, extract information from the first network communication, identify a privacy rule based on the information, generate a second network communication based on the first network communication and the privacy rule, and cause the second network communication to be sent.

19 Claims, 9 Drawing Sheets

(56) References Cited

U.S. PATENT DOCUMENTS

| | | |
|---|---|---|
| 2011/0270453 A1 | 11/2011 | Kalogridis et al. |
| 2013/0124420 A1 | 5/2013 | Duri et al. |
| 2014/0047551 A1* | 2/2014 | Nagasundaram ....... G06F 21/60 726/26 |
| 2014/0096261 A1* | 4/2014 | Boldyrev ............ G06F 21/6263 726/26 |
| 2016/0371508 A1 | 12/2016 | McCorkendale et al. |

OTHER PUBLICATIONS

Extended European Search Report in European Application No. 16815041.5, dated Oct. 9, 2018, 9 pages.

\* cited by examiner

700

| Conditions | Rules |
|---|---|
| Finance Website | Use encryption for sending over VPN |
| Protest Website AND High Risk Location | Use Tor for sending over onion routing |
| Dating application | Use encryption for sending over VPN |
| Website related to embarrassing music | Send via at least two proxy servers |

Fig. 7

TECHNIQUES FOR MANAGING PRIVACY OF A NETWORK COMMUNICATION

FIELD OF THE DISCLOSURE

The present disclosure relates to network communications technologies, and more particularly, to techniques for managing privacy of a network communication.

BACKGROUND OF THE DISCLOSURE

The use of electronic devices to access content over networks has grown significantly over the years. People now access websites over networks, such as the Internet, to obtain information, share their thoughts, manage their personal lives, entertain themselves, and for many other reasons. With so much of a person's daily life now involving communication "online," there is a vast amount of information available to entities that monitor, or intercept, these communications, such as companies, hackers, governments, and others. Moreover, many of these entities are incentivized to gather this information for personal gain, sale, or control. For example, companies may sell this information to other companies that may use it to target advertising at people with certain characteristics. As another example, repressive governments may use this information to identify individuals who disagree with their policies, or who are trying to organize protests. However, individuals may not want their communications to be accessible to these entities. In particular, individuals may be hesitant to provide certain personal information, such as information about their finances or political thoughts, online for fear of it being monitored or intercepted.

Different techniques have been used to secure, encrypt, and/or anonymize communications. However, these techniques may be limited, complex to implement, and/or inconvenient. These techniques may also have disadvantages for network communications, such as increased packet sizes and slower network communication speeds. Moreover, many users may not even be aware that these techniques are available.

In view of the foregoing, it may be understood that there may be significant problems and shortcomings associated with current network communications techniques.

SUMMARY OF THE DISCLOSURE

Techniques for managing privacy of a network communication are disclosed. In addition, the present disclosure provides for encrypting and/or anonymizing a network communication based on one or more rules.

In accordance with the present disclosure, there is provided a computer-implemented system for managing privacy of a network communication. The system comprises one or more memory devices that store instructions, and one or more computer processors that execute the instructions. The one or more computer processors execute the instructions to receive a first network communication, and to extract information from the first network communication. The one or more computer processors also execute the instructions to identify a privacy rule based on the information. The one or more computer processors further execute the instructions to generate a second network communication based on the first network communication and the privacy rule, and to cause the second network communication to be sent.

In accordance with other aspects of the disclosure, the second network communication includes data from the first network communication, and the system is a router that routes the first network communication by generating and sending the second network communication.

In accordance with additional aspects of the disclosure, the system further comprises a storage device, and the privacy rule is selected from a plurality of privacy rules stored on the storage device.

In accordance with further aspects of the disclosure, the privacy rule is identified based on the information relating to a particular domain name or Internet Protocol (IP) address.

In accordance with still further aspects of the disclosure, the one or more processors further execute the instructions to identify a category of website associated with the domain name or IP address, and identify the privacy rule based on the category of website.

In accordance with other aspects of the disclosure, the privacy rule is identified based on the information relating to one or more of a port or protocol used by the client device in sending the first network communication.

In accordance with still other aspects of the disclosure, the privacy rule is configured by a user of the client device.

In accordance with additional aspects of the disclosure, the information indicates that the user of the client device wants to anonymize the second network communication.

In accordance with further additional aspects of the disclosure, the second network communication is generated by encapsulating one or more messages from the first network communication in one or more layers of encryption.

In accordance with other aspects of the disclosure, the second network communication is generated for sending over an onion routing network.

In accordance with additional aspects of the disclosure, the second network communication is generated for sending over a virtual private network (VPN).

Furthermore, in accordance with the present disclosure, there is provided a computer-implemented method for managing privacy of a network communication. The method comprises receiving a first network communication from a client device, and extracting information from the first network communication. The method also comprises identifying, by one or more computer processors, a privacy rule based on the information. The method further comprises generating a second network communication from the first network communication based on the privacy rule, and sending the second network communication.

In accordance with other aspects of the disclosure, the privacy rule is identified based on the information relating to a particular domain name or Internet Protocol (IP) address.

In accordance with still other aspects of the disclosure, the method further comprises identifying a category of website associated with the domain name or IP address, and identifying the privacy rule based on the category of website.

In accordance with further aspects of the disclosure, the privacy rule is identified based on the information relating to one or more of a port or protocol used in the client device in sending the first network communication.

In accordance with still further aspects of the disclosure, the privacy rule is configured by a user of the client device.

In accordance with additional further aspects of the disclosure, the information indicates that the user of the client device wants to anonymize the second network communication.

In accordance with other aspects of the disclosure, the second network communication is generated by encapsulating one or more messages from the first network communication in one or more layers of encryption.

In accordance with further aspects of the disclosure, the second network communication includes data from the first network communication, and the method further comprises routing the first network communication by generating and sending the second network communication.

Additionally, in accordance with the present disclosure, there is provided a non-transitory computer-readable medium storing instructions that, when executed by one or more computer processors, cause the one or more computer processors to perform a method for managing privacy of a network communication. The method comprises receiving a first network communication, and extracting information from the first network communication. The method also comprises identifying a privacy rule based on the information. The method further comprises generating a second network communication from the first network communication based on the privacy rule, and sending the second network communication.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate understanding of the present disclosure, reference is now made to the accompanying drawings, in which like elements are referenced with like numerals. These drawings should not be construed as limiting the present disclosure, but are intended to be illustrative only.

FIG. 7 illustrates an example table of privacy profiles for managing privacy of network communications, consistent with embodiments of the present disclosure.

DETAILED DESCRIPTION OF EXAMPLE EMBODIMENTS

Reference will now be made in detail to the example embodiments of the present disclosure, certain examples of which are illustrated in the accompanying drawings.

Embodiments of the present disclosure relate to computerized systems, methods, and media for managing privacy of a network communication. Embodiments of the present disclosure include computerized systems, methods, and media for encrypting and/or anonymizing network communications based on one or more rules.

The use of electronic devices to access content over networks has grown significantly over the years. People now access websites over networks, such as the Internet, to obtain information, share their thoughts, manage their personal lives, entertain themselves, and for many other reasons. With so much of a person's daily life now involving communication "online," there is a vast amount of information available to entities that monitor, or intercept, these communications, such as companies, hackers, governments, and others. Moreover, many of these entities are incentivized to gather this information for personal gain, sale, or control. For example, companies may sell this information to other companies that may use it to target advertising at people with certain characteristics. As another example, repressive governments may use this information to identify individuals who disagree with their policies, or who are trying to organize protests. However, individuals may not want their communications to be accessible by these entities. In particular, individuals may be hesitant to provide certain personal information, such as information about their finances or political thoughts, online for fear of it being monitored or intercepted.

Figure 1:
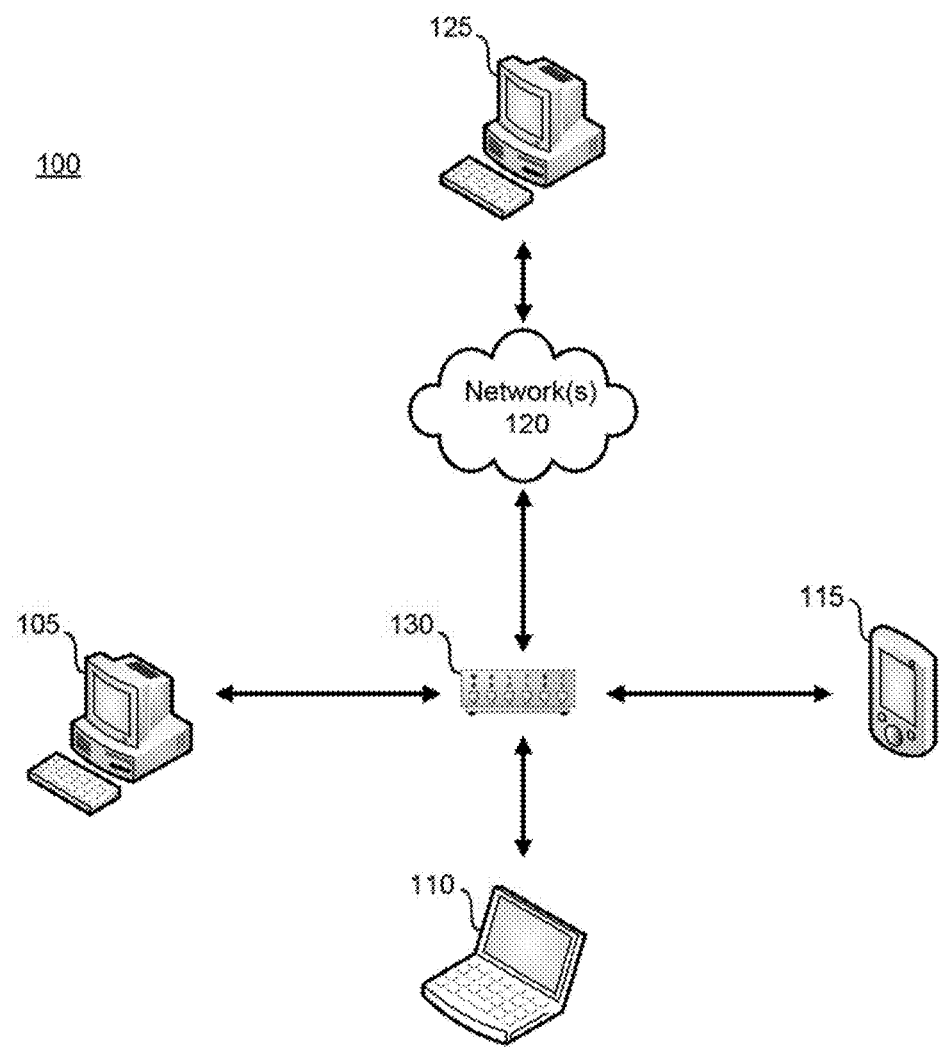
FIG. 1 illustrates an example communications environment for implementing embodiments and features consistent with the present disclosure.

FIG. 1 illustrates an example communications environment 100 for routing network communications. In communications environment 100, a router 130 may route communications between one or more computing devices 105, 110, 115 and one or more computing devices 125 over one or more networks 120, such as the Internet. Computing devices, 105, 110, 115 may be connected to router 130 over a local area network (LAN). When communicating with computing device(s) 125 over the Internet, for example, communications may occur in packets of data. Each of the packets may include, for example, a source address field, a destination address field, and other data. The source address field and destination address field may include Internet Protocol (IP) addresses, for example. When a router 130 receives a first packet from one of computing devices 105, 110, 115 that is destined for communication over network(s) 120, it may save the source IP address and destination IP address from the first packet in a table, and then may replace the source IP address in the source address field of the first packet with an IP address of the router before sending the first packet to computing device 125 over network(s) 120. For example, when computing device 105 sends a packet destined for computing device 125, router 130 may save the source IP address, which may be the IP address of computing device 105, in a table, and then may replace the source IP address in the first packet with an IP address of the router before sending the packet to computing device 125 over network(s) 120.

When computing device 125 receives the first packet, it may extract the source IP address. Computing device 125 may then communicate a reply by sending a second packet. The second packet may include a source address field, a destination address field, and other data. In order to route the second packet to the computing device that sent the first packet (e.g., computing device 105), the destination address field of the second packet may be set to the source address of the first packet (e.g., the IP address of router 130). The source address field of the second packet may include the IP address of computing device 125. When router 130 receives the second packet, it may identify that the source address of the second packet is the same address as the destination address of the first packet. Based on this identification, router 130 may realize that the second packet is likely a response to the first packet sent by computing device 105, and may route the second packet to computing device 105.

When individuals communicate over a network, such as the Internet, these communications may be monitored or intercepted by entities, such as companies, hackers, governments, and others. Thus, these entities may access the source addresses, destination addresses, and/or data of the communications they intercept. However, individuals may not want the data they communicate or their identities (e.g., as indicated by source or destination addresses), to be accessible to other entities.

Different techniques can be used to add privacy to network communications. Some of these techniques may be implemented at a router, which can encrypt and/or anonymize communications before routing the communications to their next destination in a network.

Figure 2:
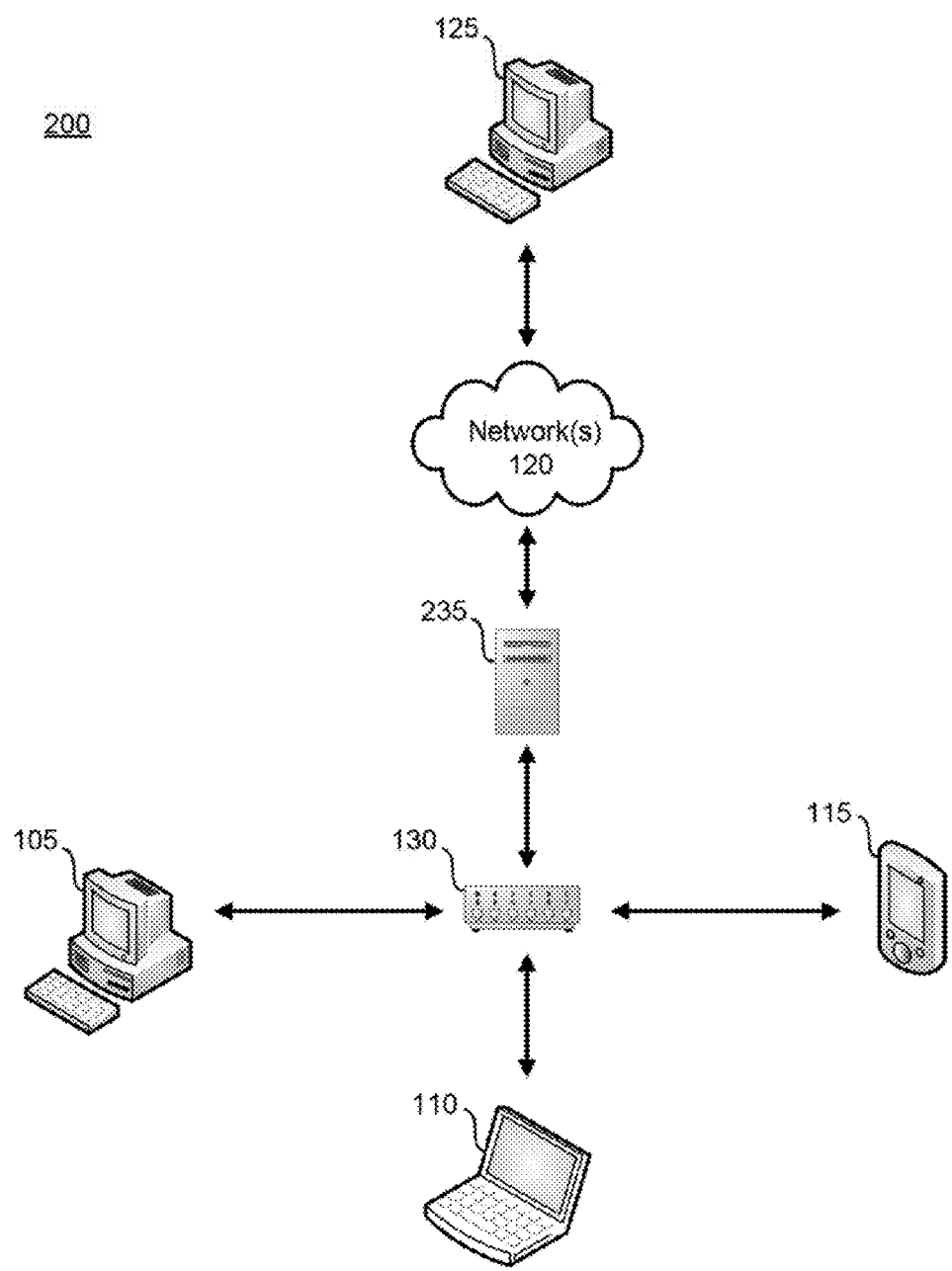
FIG. 2 illustrates another example communications environment for implementing embodiments and features consistent with the present disclosure.

FIG. 2 illustrates an example communications environment 200 for using one technique for adding privacy to network communications. In communications environment 200, router 130 may route communications between one or more computing devices 105, 110, 115 and one or more computing devices 125 over one or more networks 120, such as the Internet. Computing devices 105, 110, 115 may be connected to router 130 over a LAN. Like in the example described with respect to FIG. 1, communications may occur in packets of data, and each of the packets may include, for example, a source address field, a destination address field, and other data. The source address field and destination address field may include IP addresses, for example. Communications environment 200 may also include one or more proxy servers 235. Although illustrated as being separate from network(s) 120, proxy server(s) 235 may be computing devices within network(s) 120 for relaying communications. Communications in communications environment 200 may occur similarly to that described with respect to FIG. 1; however, proxy server(s) 235 may add additional levels of anonymity to the communications.

A proxy server 235 may operate in a manner similar to the way router 130 may operate (e.g., as described with respect to FIG. 1). When a proxy server 235 receives a first packet from a router 130, it may save the source IP address (e.g., the IP address of router 130) and destination IP address form the first packet in a table, and then replace the source IP address in the source address field of the first packet with an IP address of proxy server 235 before sending the first packet to computing device 135 over network(s) 120. When computing device 125 receives the first packet, it may extract the source IP address (e.g., the IP address of proxy server 235). Computing device 125 may then communicate a reply by sending a second packet. The second packet may include a source address field, a destination address field, and other data. In order to route the second packet to the computing device that sent the first packet, the destination address field of the second packet may be set to the source address of the first packet (e.g., the IP address of proxy server 235). The source address field of the second packet may include the IP address of computing device 125.

When proxy server 235 receives the second packet, it may identify that the source address of the second packet is the same address as the destination address of the first packet. Based on this identification, proxy server 235 may realize that the second packet is likely a response to the first packet sent by router 130, and may route the second packet to router 130. Router 130 may then route the second packet to the computing device that originally sent the first packet, as described above with respect to FIG. 1. Thus, adding a proxy server to the communication path between a computing device 105, 110, 115 and a computing device 125 adds another layer of anonymity to the communication, because the identity (e.g., IP address) of router 130 is replaced with the identity (e.g., IP address) of proxy server 235 as communications pass through proxy server 235. This may be referred to as an additional "hop" in the communication path between a computing device 105, 110, 115 and a computing device 125. While FIG. 2 illustrates an example involving one proxy server, communications between a computing device 105, 110, 115 and a computing device 125 may be passed through additional proxy servers (additional hops) to further anonymize the communications.

Figure 3:
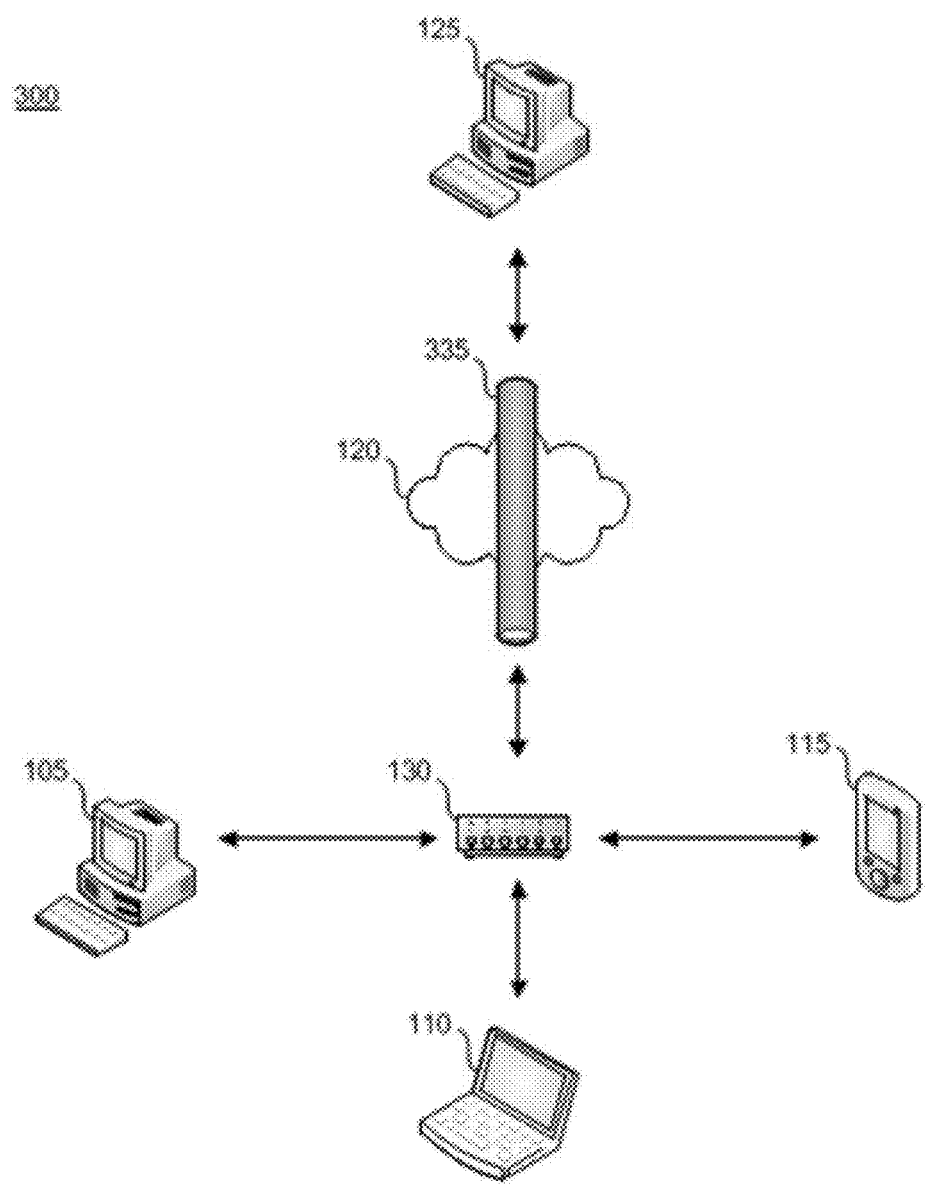
FIG. 3 illustrates still another example communications environment for implementing embodiments and features consistent with the present disclosure.

FIG. 3 illustrates an example communications environment 300 for using another technique for adding privacy to network communications. In communications environment 300, router 130 may route communications between one or more computing devices 105, 110, 115 and one or more computing devices 125 over one or more networks 120, such as the Internet. Computing devices 105, 110, 115 may be connected to router 130 over a LAN. Like in the example described with respect to FIG. 1, communications may occur in packets of data, and each of the packets may include, for example, a source address field, a destination address field, and other data. The source address field and destination address field may include IP addresses, for example. Communications environment 300 may also include one or more virtual private networks (VPNs) 335. Communications in communications environment 300 may occur similarly to that described with respect to FIG. 1; however, VPN(s) 335 may add additional levels of anonymity and/or security to the communications.

A VPN may extend a private network across a public network, such as the Internet. It may enable a computing device to communicate data across a public network while benefiting from the security and/or anonymity of a private network. A VPN may be created by establishing a virtual point-to-point connection through one or more dedicated connections, virtual tunneling protocols, and/or use of encryption. Secure VPN protocols may include, for example, Internet Protocol Security (IPsec), Transport Layer Security (TLS), Secure Sockets Layer (SSL), Datagram Transport Layer Security (DTLS), Microsoft® Point-to-Point Encryption (MPPE), Microsoft® Secure Socket Tunneling Protocol (SSTP), Multi Path Virtual Private Network (MPVPN), Secure Shell (SSH) VPN, and other protocols. Encrypting communications and/or sending communications over a trusted network using VPN may make it more difficult for entities to monitor or intercept the communications. For example, the entities may be required to decrypt the communications and/or bypass security protocols of the network before they can understand the information in the communications.

Figure 4:
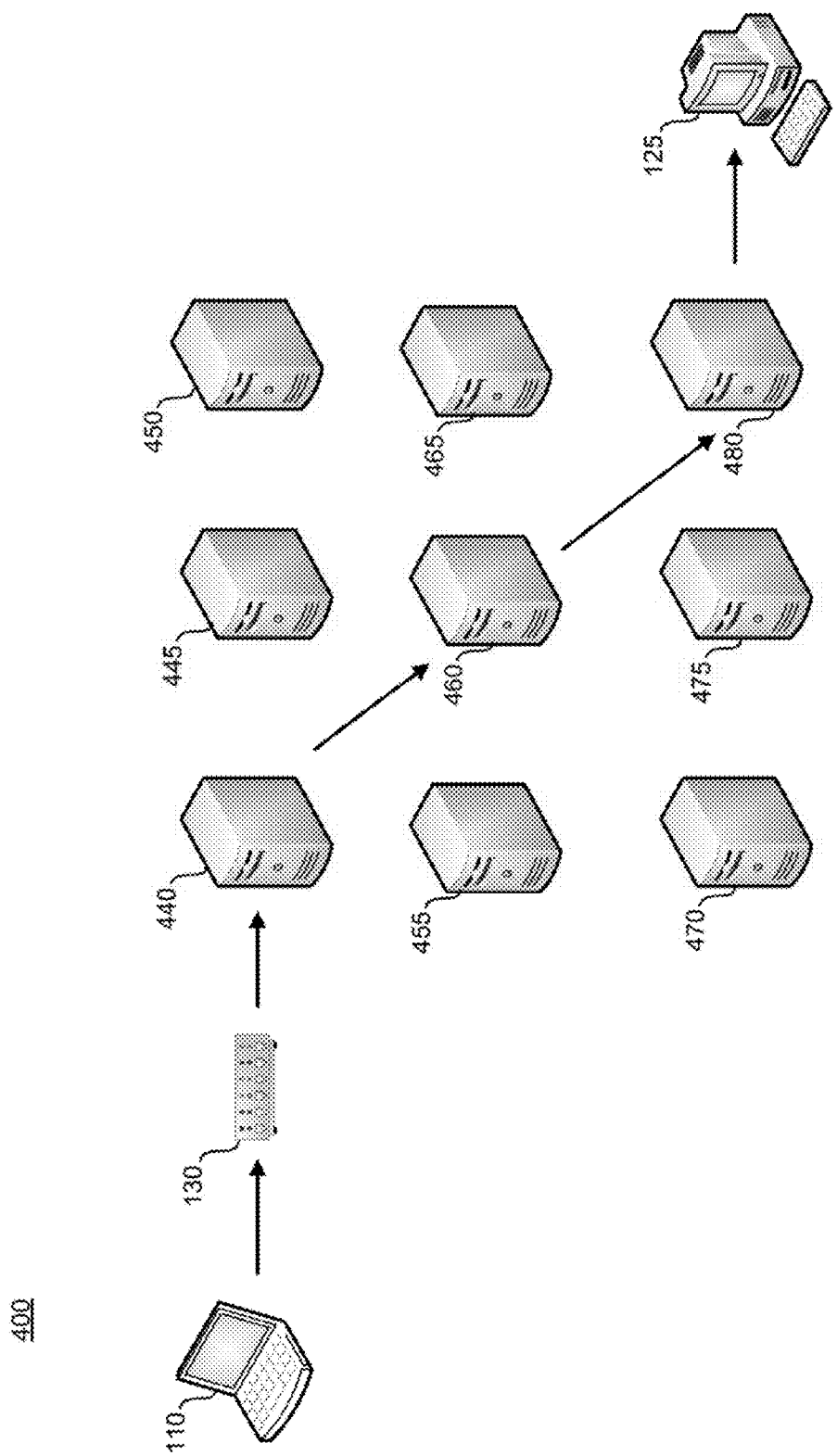
FIG. 4 illustrates a further example communications environment for implementing embodiments and features consistent with the present disclosure.

FIG. 4 illustrates an example communications environment 400 for using still another technique for adding privacy to network communications. In communications environment 400, router 130 may route communications between one or more computing devices 105, 110, 115 (although only computing device 110 is illustrated in FIG. 4) and one or more computing devices 125 over one or more networks 120 (not shown in FIG. 4), such as the Internet. Computing devices 105, 110, 115 may be connected to router 130 over a LAN. Like in the example described with respect to FIG. 1, communications may occur in packets of data, and each of the packets may include, for example, a source address field, a destination address field, and other data. The source address field and the destination address field may include IP addresses, for example. Communications environment 400 may also include one or more onion routers 440-480. Onion routers 440-480 may be computing devices that are separate from network(s) 120, or may be computing devices within network(s) 120, for relaying communications. Onion routers 440-480 may be connected together with one or more networks (not shown), such that communications may occur between any two onion routers 440-480.

In onion routing, communication packets may be encapsulated in layers of encryption, like the layers of an onion. To transmit a packet over an onion routing network, a computing device may select a set of onion routers from a list of onion routers. The selected list of onion routers may then be arranged into a communication path through which the packet will be transmitted. FIG. 4 illustrates an example communication path in which the packet is routed through onion routers 440, 460, and 480 to computing device 125.

A layer of encryption may be added for each onion router in the communication path, such that each of the encryption layers may be decrypted by only one corresponding onion router in the communication path. As the packet travels the communication path, each of the onion routers may peel away a single layer of encryption, revealing only the next destination to which the packet is to be sent. As a result, the destination of the packet may remain hidden until the last onion router in the communication path peels away the last layer of encryption. Moreover, the sender of the packet may remain anonymous, because each onion router only knows the source address of the onion router from which it received the packet. Thus, onion routing may provide for security and/or anonymity in network communications.

Tor is software that may enable anonymous communication over an onion routing network. Individuals can install Tor software, such as a Tor browser, which may allow them to send communications through a volunteer network of onion routers. When an individual chooses to transmit communications using Tor, the communications packets, including the destination address of the packets, may be encrypted multiple times and sent through a communication path of randomly selected onion routers. Each of the onion routers may then decrypt a layer of encryption to reveal only the next onion router in the communication path. When the final onion router in the communication path decrypts the innermost layer of encryption, it may send the communication packet to its final destination.

The techniques discussed above are only a few of the techniques available for adding privacy to network communications. Nevertheless, existing techniques for adding privacy to network communications may be limited to certain individuals, can be complex to implement, and may be inconvenient to use. Moreover, while adding security and/or anonymity to network communications, the techniques may have disadvantages for network communications. For example, use of encryption may slow network communications as packet sizes get larger and processing times (e.g., latencies due to decryption) increase. Accordingly, even when individuals understand how to add privacy to network communications, they may wish to add differing levels of privacy to different types of network communications, to take advantage of higher network speeds when higher levels of privacy are not required. However, manually selecting to transition between different network communications techniques may be inconvenient for users.

Embodiments of the present disclosure can address the challenges associated with adding privacy to network communications. For example, embodiments of the present disclosure provide computerized systems, methods, and media for managing privacy of network communications. In some embodiments, the computerized systems, methods, and media may encrypt and/or anonymize network communications based on one or more rules. For example, a computing device, such as a router, may receive a first network communication, such as a communication packet, and extract information from the first network communication. The information may relate, for example, to an IP address or domain name to which the user is requesting a connection, or to a request from the user that a level of privacy be added to the network communication. Based on the information, a privacy rule may be identified. A second network communication may then be generated based on the first network communication and the privacy rule. For example, the second network communication may be a second packet, which is encrypted and contains data from the first packet, and/or a second packet that contains data from the first packet, but is rerouted to a proxy server. That is, the second network communication may be a routed version of the first network communication with a certain level of encyprtion and/or anonymity added. The second network communication may then be sent to a next destination in the network on the way to the communication's final destination.

The computer-implemented methods disclosed herein may be executed, for example, by one or more computer processors that receive instructions from one or more non-transitory computer-readable mediums. Similarly, systems consistent with the present disclosure may include at least one computer processor and memory, and the memory may be a non-transitory computer-readable medium.

As used herein, a non-transitory computer-readable medium refers to any type of physical memory on which information or data readable by a computer processor may be stored. Examples include random access memory (RAM), read-only memory (ROM), volatile memory, non-volatile memory, hard drives, compact disc ROMs (CD ROMs), digital versatile discs (DVDs), flash drives, magnetic strip storage, semiconductor storage, optical disc storage, magneto-optical disc storage, and/or any other known physical storage medium. Singular terms, such as "memory" and "computer-readable storage medium," may additionally refer to multiple structures, such as a plurality of memories and/or computer-readable storage mediums.

As used herein, a "memory" may comprise any type of computer-readable storage medium unless otherwise specified. A computer-readable storage medium may store instructions for execution by one or more processors, including instructions for causing the one or more computer processors to perform steps or stages consistent with embodiments disclosed herein. Additionally, one or more computer-readable storage mediums may be utilized in implementing a computer-implemented method.

As used herein, the indefinite articles "a" and "an" mean "one or more" in open-ended claims containing the transitional phrase "comprising," "including," and/or "having."

Figure 5:
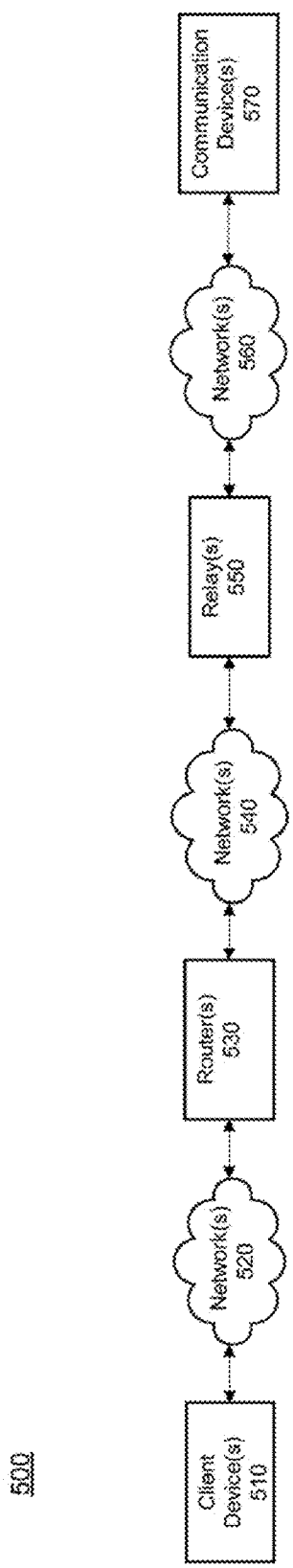
FIG. 5 illustrates a block diagram of an example computing environment for implementing embodiments and features consistent with the present disclosure.

FIG. 5 is a block diagram of an example computing environment 500 for implementing embodiments of the present disclosure. The arrangement and number of components in computing environment 500 is provided for purposes of illustration. Additional arrangements, number of components, and other modifications may be made, consistent with the present disclosure. In some embodiments, computing environment 500 may correspond to, and by another way of representing, any one or more of the communications environments described with respect to FIGS. 1-4.

As shown in FIG. 5, computing environment 500 may include one or more client devices 510, networks 520, 540, 560, routers 530, relays 550, and communication devices 570. Client devices 510 may be coupled to router(s) 530, relay(s) 550, and communication device(s) 570 by one or more networks 520, 540, 560.

By way of example, a client device 510 could be a personal computer, desktop computer, laptop computer, server, web server, mobile computer, mobile phone, smart phone, tablet computer, netbook, electronic reader, personal digital assistant (PDA), wearable computer, smart watch, gaming device, set-top box, television, personal organizer, portable electronic device, smart appliance, navigation device, and/or other type of computing device. In some embodiments, a client device 510 could include one of client devices 105, 110, 115 described with respect to FIGS. 1-4. In some embodiments, a client device 510 may be implemented with hardware devices, and/or software applications running thereon. A client device 510 may communicate with one or more computer systems (e.g., router(s) 530, relay(s) 550, communication device(s) 570) over one or more networks 520, 540, 560. A client device 510 may store browser software that enables client device 510 to access resources on a network, such as the Internet. In some embodiments, one or more of client devices 510 may be implemented using a computer system, such as computer system 900 of FIG. 9.

Computing environment 500 may include one or more networks 520. In one embodiment, network(s) 520 may be one or more local networks (e.g., personal area networks (PANs), LANs, metropolitan area networks (MANs)), though the disclosure is not so limited. Network(s) 520 may connect client device(s) 510 with one or more router(s) 530, relay(s) 550, communication devices 570, and/or other client devices 510. Network(s) 520 may include one or more PANs, LANs, MANs, wide area networks (WANs), or any combination of these networks. Network(s) 520 may include any combination of one or more of a variety of different network types, including Ethernet, intranet, twisted-pair, coaxial cable, fiber optic, cellular, satellite, Institute of Electrical and Electronics Engineers (IEEE) 802.11, Wi-Fi, terrestrial, Internet, infrared, and/or other types of wired or wireless networks. Network(s) 520 may include a network with a topology and functionality for carrying out one or more techniques for adding privacy to communications, such as one or more of the techniques described with respect to FIGS. 1-4.

Client device(s) 510, relay(s) 550, and/or communication device(s) 570 may be configured to communicate with one or more routers 530 through one or more networks 520, 540, 560. A router may be a home gateway (HGW), relay, bridge, switch, access point, hub, connection point, or any other type of device that may relay messages onto different networks, or different links of a network. In some embodiments, a router may append or remove data, such as encryption data and/or network address information, to received communications data. A router 530 may be any type of device for relaying network messages, and may exist as software, hardware, or a combination of software and hardware. In some embodiments, a router 530 could include router 130 described with respect to FIGS. 1-4. In some embodiments, one or more of routers 530 may be implemented using a computer system, such as computer system 900 of FIG. 9.

Computing environment 500 may also include one or more networks 540. Network(s) 540 may connect relay(s) 540 with one or more routers 530 and/or one or more communication devices 570. Network(s) 540 may include one or more PANs, LANs, MANs, WANs, or any combination of these networks. Network(s) 540 may include a combination of one or more of a variety of different network types, including Ethernet, intranet, twisted-pair, coaxial cable, fiber optic, cellular, satellite, IEEE 802.11, Wi-Fi, terrestrial, Internet, and/or other types of wired or wireless networks. Network(s) 540 may include a network with a topology and functionality for carrying out one or more techniques for adding privacy to communications, such as one or more of the techniques described with respect to FIGS. 1-4.

Client device(s) 510, router(s) 530, and/or communication device(s) 570 may be configured to communicate with one or more relays 550 through one or more networks 520, 540, 560. A relay 550 may be a router, bridge, gateway, server, proxy server, switch, or other type of device that may relay messages onto different networks, or different links of a network. In some embodiments, a relay 550 may append or remove data, such as encryption data and/or network address information, to received communications data. A router 530 may be any type of device for relaying network messages, and may exist as software, hardware, or a combination of software and hardware. In some embodiments, a relay 550 could include proxy server 235, or an onion router (e.g., one of onion routers 440-480) described with respect to FIGS. 1-4. In some embodiments, one or more of routers 530 may be implemented using a computer system, such as computer system 900 of FIG. 9.

Computing environment 500 may also include one or more networks 560. Network(s) 560 may connect communication device(s) 570 with one or more relays 550, routers 530, and/or client devices 510. Network(s) 560 may include one or more PANs, LANs, MANs, WANs, or any combination of these networks. Network(s) 560 may include a combination of one or more of a variety of different network types, including Ethernet, intranet, twisted-pair, coaxial cable, fiber optic, cellular, satellite, IEEE 802.11, Wi-Fi, terrestrial, Internet, and/or other types of wired or wireless networks. Network(s) 560 may include a network with a topology and functionality for carrying out one or more techniques for adding privacy to communications, such as one or more of the techniques described with respect to FIGS. 1-4.

Client device(s) 510, router(s) 530, and/or relay(s) 550 may be configured to communicate with one or more communication devices 570. A communication device 570 may include any type of computing device that can connect to network(s) 560 and communicate with client device(s) 510. A communication device 570 may include a server, web server, server farm, personal computer, desktop computer, laptop computer, server, web server, mobile computer, mobile phone, smart phone, tablet computer, netbook, electronic reader, personal digital assistant (PDA), wearable computer, smart watch, gaming device, set-top box, television, personal organizer, portable electronic device, smart appliance, navigation device, and/or other type of computing device. In some embodiments, a communication device 570 could include client device 125 described with respect to FIGS. 1-4. In some embodiments, a communication device 570 may be implemented with hardware devices, and/or software applications running thereon. A communication device 510 may communicate with one or more computer systems (e.g., client device(s) 510, router(s) 530, relay(s) 550) over one or more networks 520, 540, 560. In some embodiments, one or more of communication devices 570 may be implemented using a computer system, such as computer system 900 of FIG. 9.

Although computing environment 500 of FIG. 5 illustrates separate client device(s) 510, router(s) 530, relay(s) 550, and communication device(s) 570, the disclosure is not so limited. Any of router(s) 530, relay(s) 550, and/or communication device(s) 570 could be implemented together on the same computer system, such as on computer system 900 of FIG. 9.

Although computing environment 500 of FIG. 5 illustrates separate network(s) 520, 540, 560, the disclosure is not so limited. For example, embodiments of the present disclosure may be implemented in computing environments utilizing only one or two networks, which may include only local network(s) and/or wide area network(s).

Figure 6:
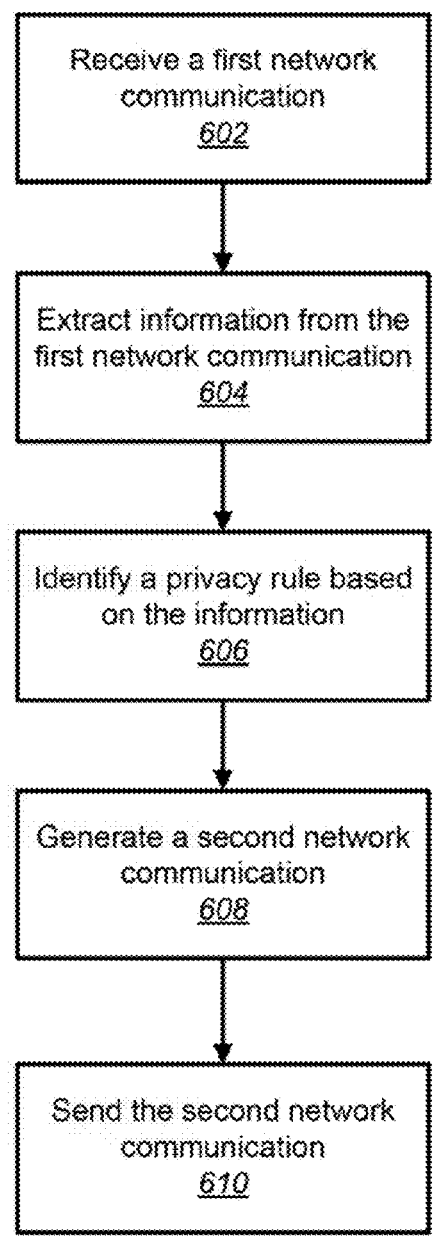
FIG. 6 illustrates a flowchart of an example method for managing privacy of network communications, consistent with embodiments of the present disclosure.

FIG. 6 illustrates a flowchart of an example method 600 for managing privacy of a network communication, consistent with embodiments of the present disclosure. Example method 600 may be implemented in a computing environment (see, e.g., FIG. 5) using one or more computer systems (see, e.g., computer system 900 of FIG. 9). In some embodiments, method 600 may be performed by one or more routers 530, by one or more relays 550, or any combination of the above.

In step 602 of method 600, a first network communication may be received. The first network communication may be received from a client device, such as a client device 510. The first network communication may include one or more segments of a message. For example, the first network communication may include one or more packets, frames, datagrams, cells, or any other type of message segment used by a particular network protocol and/or network protocol layer. The first network communication may be a communication intended to be routed to a destination device, such as a communication device 570. The first network communication may include information.

In step 604 of method 600, the information may be extracted from the network communication. The information may identify, for example, a destination address, domain name, or universal resource locator (URL) of a particular communication device with which the client device wishes to communicate. Alternatively, or additionally, the information may identify any combination of one or more of a location of the client device, a protocol used by the client device in sending the network communication, and a port used by the client device used in sending the network communication. Alternatively, or additionally, the information may identify a request from a user of the client device to add a certain level of privacy to the network communication, and/or to future network communications related to the network communication.

In step 606 of method 600, a privacy rule may be identified based on the information. For example, one or more privacy rules may be stored in a storage device. The privacy rules may be stored as privacy profiles, each of which may associate one or more rules for anonymizing and/or encrypting communications with one or more conditions. The one or more conditions may relate to information that may be extracted from network communications, such that a privacy profile may be identified based on the extracted information.

In step 608 of method 600, a second network communication may be generated. In some embodiments, the second network communication may include data from the first network communication, and may include encryption, a different destination address, and/or other data for adding privacy to the communication. In some embodiments, the second network communication may be a routed version of the first network communication. That is, the message information of the first network communication intended for relay to the destination device (e.g., communication device 570) may be included in the second network communication.

In step 610 of method 600, the second network communication may be sent. The second network communication may be sent, for example, to a next relay or router in a communication path between the client device and the destination communication device.

FIG. 7 illustrates an example table of privacy profiles, including their associated conditions and rules. A plurality of privacy profiles may be stored, for example, in a storage device at a router 530 and/or relay 550. In some embodiments, a condition may specify a particular IP address, URL, or domain name, and one or more rules for handling communications involving the particular IP address, URL, or domain name. For example, information extracted from a first communication may indicate that the client device is requesting to access and/or interact with a web server associated with http://www.example.com. A condition may be specified for http://www.example.com, and one or more rules may be associated with the condition. When http://www.example.com is identified from the information extracted from the first network communication, the computer system (e.g., computer system 900 of FIG. 9) implementing method 600 may know to apply the one or more rules in routing the network communication.

In some embodiments, a computer system (e.g., computer system 900 of FIG. 9) implementing method 600 may store information categorizing websites. This information may be received over one or more networks (e.g., network(s) 520, 540, 560) from one or more servers or service providers that provide this type of information. The information may be received on request from the computer system, or on a periodic basis. The information may indicate, for example, that http://www.example.com is a finance website. When information is extracted from the first network communication identifying http://www.example.com, the computer system (e.g, computer system 900 of FIG. 9) implementing method 600 may recognize that http://www.example.com is a finance website, and that there are one or more privacy rules stored for websites in the finance category. In the example illustrated in FIG. 7, a rule indicates that the computer system (e.g., computer system 900 of FIG. 9) implementing method 600 should use encryption for routing the communication over VPN when the communication involves communication with a finance website.

In some embodiments, privacy profiles may be associated with applications. For example, if the information extracted from a first network communication indicates that the client device is communicating using a protocol and/or port of a dating application, one or more rules may be applied in routing the communication. In the example shown in FIG. 7, when the information indicates that the client device is communicating using a dating application, the communication may be routed using encryption for sending the communication over VPN.

In some embodiments, a client device's location may be used in determining whether to apply one or more privacy rules. For example, information about risk factors associated with various locations may be stored in a computer system (e.g., computer system 900 of FIG. 9) implementing method 600. In the example illustrated in FIG. 7, when information extracted from a first network communication indicates that the client device is in a high risk location (e.g., a country with a repressive government), and further indicates that the client device is attempting to access and/or interact with a protest website, a rule may indicate that Tor should be used for routing the communication over an onion routing network.

Any combination of one or more conditions and/or one or more rules may be used in the privacy profiles. For example, a privacy profile may include any combination of one or more conditions relating to a website, website category, application, application type, protocol, port, explicit user privacy request, network activity categories, network traffic categories, client device location, or any other conditions. A privacy profile may also include any combination of one or more rules, such as rules for encrypting (e.g., using one or more of IPsec, TLS, SSL, DTLS, MPPE, SSTP, MPVPN, SSH VPN, onion routing, and Tor), and/or anonymizing (e.g., using proxy servers, onion routing, and/or Tor) network communications.

Figure 8:
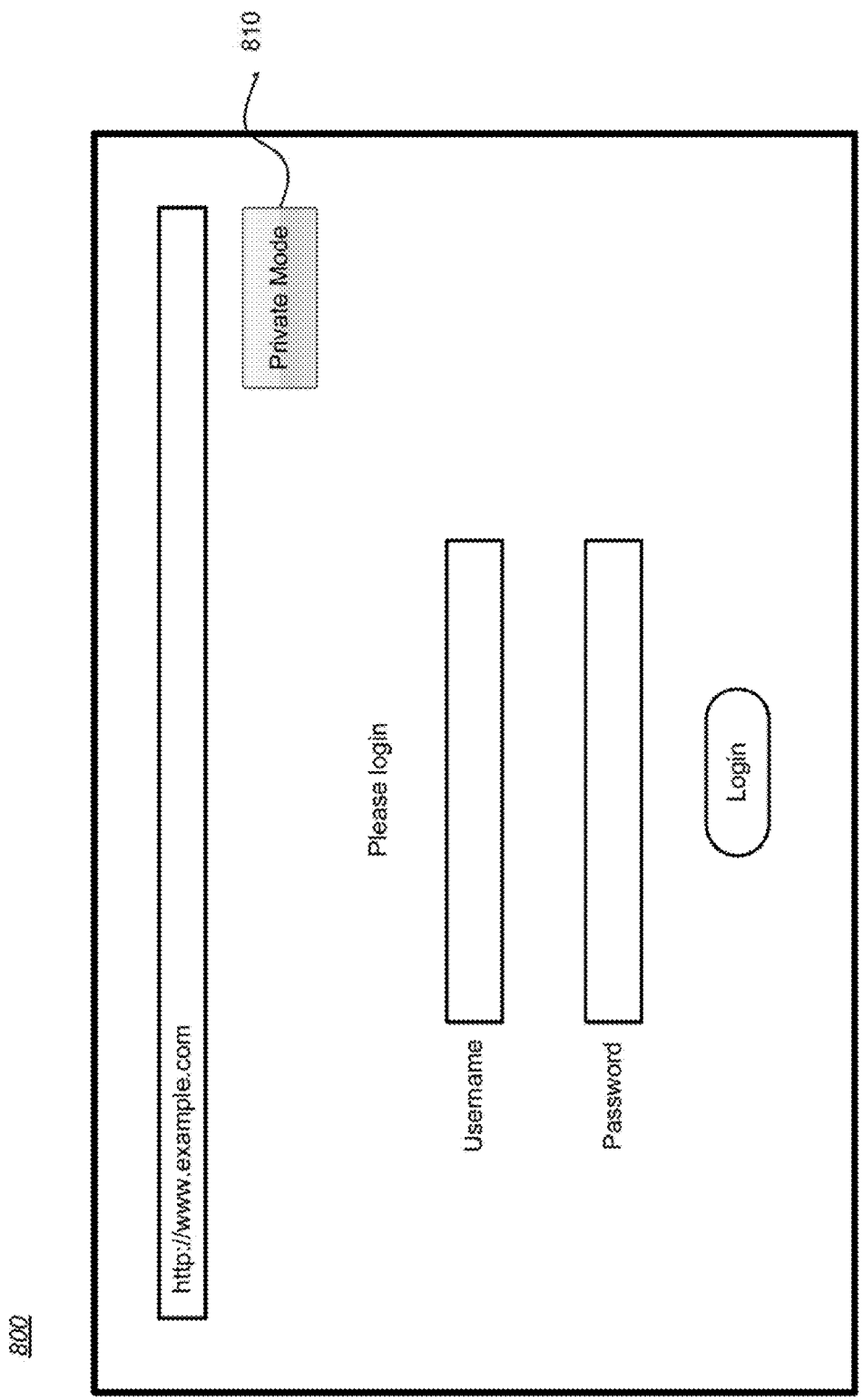
FIG. 8 illustrates an example screen of a web browser for managing privacy of network communications, consistent with embodiments of the present disclosure.

In some embodiments, a client device 510 may be configured with software for making explicit requests for adding privacy to communications. The software may include, for example, a plug-in for web browsing software, or any other type of client application. FIG. 8 illustrates an example screen 800 of a web browser with a webpage opened to an example website at URL http://www.example.com. The web browser includes plug-in software, such that a control button (e.g., button 810) appears in the browser. Although illustrated in the upper right of screen 800, button 810 may appear anywhere in the browser software, such as in any toolbars, pull-down menus, or other graphical user interface elements. A user may select the control button to indicate that the user wishes to add privacy to network communications.

After pressing the button, all network communications issued from the client device, or issued from the client device as a result of the browser application, may have an added level of privacy, using any of the encryption and/or anonymization techniques previously described. When the user no longer wishes to add privacy to the network communications, he/she may press the control button again to disable the addition of privacy to the network communications. In some embodiments, a user may further configure a level of privacy to add to communications when the control button is pressed. For example, a user may select to use a certain type of encryption over VPN, a certain number of proxy hops, onion routing, and/or Tor. When a user selects to add privacy to network communications, the first network communication received in step 602 of method 600 may include information indicative of the explicit user request for privacy. The second network communication may then be any one or more further network communications after the user has pressed the control button, and before the user again presses the control button to disable the addition of privacy to the network communications.

Conditions and/or rules may be configured into privacy profiles by explicit user selection and/or by service provider selection. In some embodiments, conditions and/or rules may be configured by one or more machine learning algorithms. For example, a computer system (e.g., computer system 900 of FIG. 9) implementing method 600 may learn over time which websites, website categories, applications, application types, protocols, ports, network activity categories, network traffic categories, client device locations, or any other conditions, are frequently involved in communications after a user has selected to add privacy to network communications, such as using the control button. Thus, if a user of a client device often selects the control button before visiting a website associating with a certain type of embarrassing music, the computer system (e.g., computer system 900 of FIG. 9) implementing method 600 may learn that it should automatically add privacy to future network communications involving this website. Similarly, the computer system (e.g., computer system 900 of FIG. 9) implementing method 600 may learn the types of privacy rules the user of the client device selects to apply when accessing content involving any one or more of these various conditions, and may learn that it should automatically add this level of privacy to future network communications involving the same combination of conditions.

In some embodiments, a service provider may crowd source the machine-learned information from many routers 530, and provide this information among the routers 530. For example, it may be learned that many users often select to add privacy to network communications when they access the finance website at http://www.example.com. This information may be conveyed to other routers so that privacy is automatically added to network communications when information in the network communications indicates a request to access and/or interact with the website http://www.example.com.

Although the description above often describes the computer system (e.g., computer system 900 of FIG. 9) implementing method 600 as automatically adding privacy to network communications, one would recognize that the computer system could first ask the user whether he/she would like to add privacy to network communications before implementing the additional privacy. For example, if a computing system automatically determines that privacy should be added to certain network communications, it could send a message to the client device indicating that it recommends adding privacy to the communications. The user could select a button indicating that he/she wishes to add the privacy, or a button indicating that he/she does not wish to add the privacy, to the network communications. The computing system implementing method 600 may then add or refrain from adding the privacy encryption and/or anonymization based on the user's response.

Figure 9:
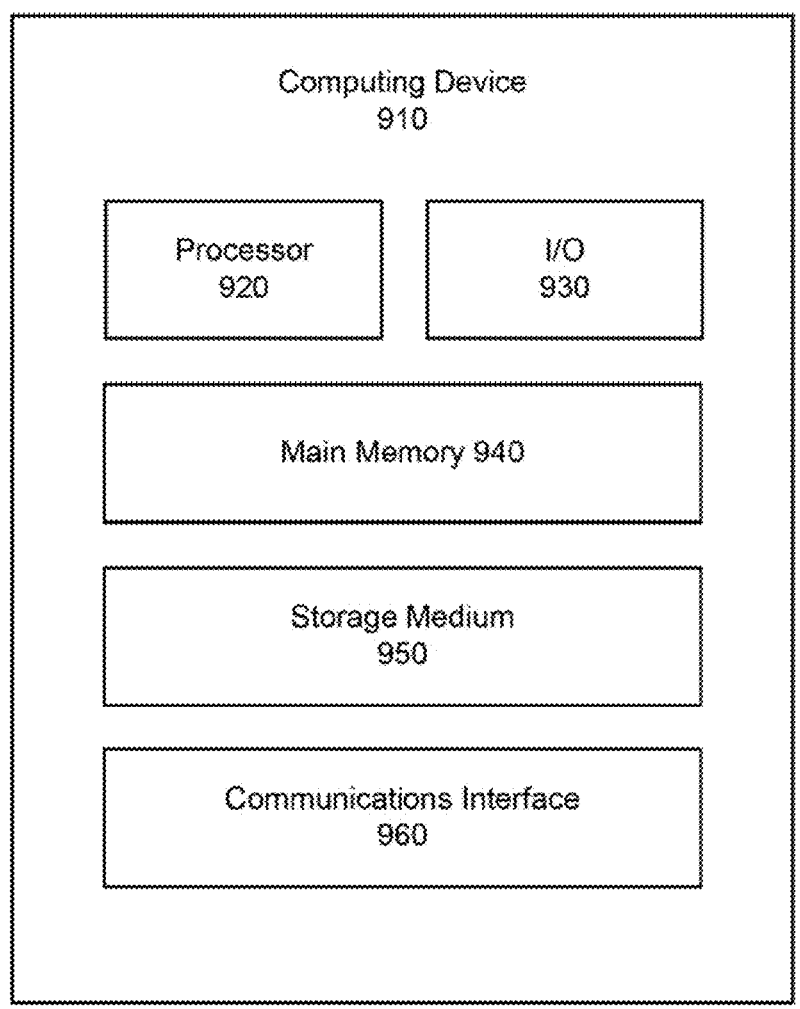
FIG. 9 illustrates a block diagram of an example computer system for implementing embodiments and features consistent with the present disclosure.

FIG. 9 is a block diagram illustrating an example computer system 900 that may be used for implementing embodiments consistent with the present disclosure, including the example systems and methods described herein. Computer system 900 may include one or more computing devices 910. Computer system 900 may be used to implement client device(s) 510, router(s) 530, relay(s) 550, and/or communication device(s) 570. The arrangement and number of components in computer system 900 is provided for purposes of illustration. Additional arrangements, number of components, or other modifications may be made, consistent with the present disclosure.

As shown in FIG. 9, a computing device 910 may include one or more processors 920 for executing instructions.

Processors suitable for the execution of instructions may include, by way of example, both general and special purpose microprocessors, and any one or more processors of any kind of digital computer. A computing device 910 may also include one or more input/output (I/O) devices 930. By way of example, I/O devices 930 may include keys, buttons, mice, joysticks, styluses, etc. Keys and/or buttons may be physical and/or virtual (e.g., provided on a touch screen interface). A computing device 910 may also be connected to one or more displays (not shown) via I/O 930. A display may be implemented using one or more display panels, which may include, for example, one or more cathode ray tube (CRT) displays, liquid crystal displays (LCDs), plasma displays, light emitting diode (LED) displays, touch screen type displays, projector displays (e.g., images projected on a screen or surface, holographic images, etc.), organic light emitting diode (OLED) displays, field emission displays (FEDs), active matrix displays, vacuum fluorescent (VFR) displays, 3-dimensional (3-D) displays, electronic paper (e-ink) displays, or any combination of the above types of displays.

A computing device 910 may include one or more storage devices configured to store data and/or software instructions used by processor(s) 920 to perform operations consistent with the disclosed embodiments. For example, a computing device 910 may include main memory 940 configured to store one or more software programs that, when executed by processor(s) 920, cause processor(s) 920 to perform functions or operations consistent with disclosed embodiments.

By way of example, main memory 940 may include NOR and/or NAND flash memory devices, read only memory (ROM) devices, random access memory (RAM) devices, etc. A computing device 910 may also include one or more storage mediums 950. By way of example, storage medium(s) 950 may include hard drives, solid state drives, tape drives, redundant array of independent disks (RAID) arrays, etc. Although FIG. 9 illustrates only one main memory 940 and one storage medium 950, a computing device 910 may include any number of main memories 940 and storage mediums 950. Further, although FIG. 9 illustrates main memory 940 and/or storage medium 950 as part of computing device 910, main memory 940 and/or storage medium 950 may be located remotely and computing device 910 may be able to access main memory 940 and/or storage medium 950 via network(s) 520, 540, 560.

Storage medium(s) 950 may be configured to store data, and may store data received from one or more client device(s) 510, router(s) 530, relay(s) 550, and/or communication device(s) 570. The data may take or represent various content or information forms, such as documents, tables, lists, IP addresses, MAC addresses, user names, passwords, authentication information, decryption keys or codes, client device information, security information, software applications, files, and any other type of information and/or content which may be used in network applications, or any combination thereof. In some embodiments, storage medium(s) 950 may be configured to store website categorization information, crowd sourced privacy information, routing tables, privacy profiles, privacy conditions, privacy rules, and/or any other type of information used to implement the embodiments disclosed herein.

A computing device 910 may further include one or more communication interfaces 960. Communication interface(s) 960 may allow software and/or data to be transferred between client device(s) 510, router(s) 530, relay(s) 550, and/or communication device(s) 570. Examples of communication interface 960 may include a modem, network interface card (e.g., Ethernet card), communications port, personal computer memory card international association (PCMCIA) slots and cards, antennas, etc. Communications interface(s) 960 may transfer software and/or data in the form of signals, which may be electronic, electromagnetic, optical, and/or other types of signals. The signals may be provided to/from communication interface(s) 960 via a communications path (e.g., network(s) 520, 540, 560), which may be implemented using wired, wireless, cable, fiber optic, radio frequency (RF), and/or other communication channels.

The disclosed embodiments are not limited to separate programs or computers configured to perform dedicated tasks. For example, a router 530 or relay 550 may include a computing device 910 that includes a main memory 940 that stores a single program or multiple programs and may additionally execute one or more programs located remotely from router 530 or relay 550, respectively. Similarly, a client device 510, router 530, relay 550, and/or communication device 570 may execute one or more remotely stored programs instead of, or in addition to, programs stored on these devices. In some examples, a router 530 and/or relay 550 may be capable of accessing separate server(s), router(s), relay(s), gateway(s), and/or other computing systems that generate, maintain, and provide network configuration, security, website categorization information, privacy information, and/or other information.

Embodiments of the present disclosure can address the challenges associated with adding privacy to network communications. The computerized systems, methods, and media disclosed herein may allow privacy to automatically be added to network communications associated with activities with which a user may be concerned, or to be added with a simple press of a button. Moreover, the computerized systems, methods, and media may allow a user to configure preferences for adding privacy to network communications, and/or provide for learning a user's preferences for adding privacy to network communications over time. Accordingly, privacy profiles may be established for network communications in which a user may be concerned about, for example, privacy, identity theft, censorship, and/or the dangers of being tracked online by oppressive governments, organizations, or agencies. Privacy profiles may also be associated with network communications in which a user may be concerned about embarrassment, such as network communications associated with pornography, sexual orientation, fetish, dating, or embarrassing music. Thus, the computerized systems, methods, and media disclosed herein provide for a convenient way of adding different layers of privacy to different communications, allowing users to freely express themselves online with less fear of adverse consequences.

The subject matter described herein can be implemented in digital electronic circuitry, or in computer software, firmware, or hardware, including the structural means disclosed in this specification and equivalents thereof, or in combinations of them. The subject matter described herein can be implemented as one or more computer program products, such as one or more programs tangibly embodied in an information carrier (e.g., in a machine readable storage device), or embodied in a propagated signal, for execution by, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable array) or an ASIC (application specific integrated circuit).

Processors suitable for the execution of a computer program include, by way of example, both general and special purpose microprocessors, and any one or more processor of any kind of digital computer. Generally, a processor may receive instructions and data from a read only memory or a random access memory or both.

Computer programs based on the written description and methods of this specification are within the skill of a software developer. The various programs or program modules can be created using a variety of programming techniques. For example, program sections or program modules can be designed in or by means of Java, C, C++, assembly language, or any such programming language. One or more of such software sections or modules can be integrated into a computer system or existing communications software.

At this point it should be noted that, as implied above, managing the addition of privacy to network communications in accordance with the present disclosure as described above may involve the processing of input data and the generation of output data to some extent. This input data processing and output data generation may be implemented in hardware or software. For example, specific electronic components may be employed in an application specific integrated circuit or similar or related circuitry for implementing the functions associated with managing the addition of privacy to network communications in accordance with the present disclosure as described above. Alternatively, one or more computer processors operating in accordance with instructions may implement the functions associated with managing the addition of privacy to network communications in accordance with the present disclosure described above. If such is the case, it is within the scope of the present disclosure that such instructions may be stored on one or more non-transitory computer-readable storage media (e.g., a magnetic disk or other storage medium), or transmitted to one or more computer processors via one or more signals embodied in one or more carrier waves.

The present disclosure is not limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, including all systems, methods, and non-transitory computer-readable media which fall within the true spirit and scope of the present disclosure.

The invention claimed is:

1. A computer-implemented system for managing privacy of a network communication, the system comprising:
   one or more memory devices that store instructions; and
   one or more computer processors that execute the instructions to:
      receive a first network communication;
      extract information from the first network communication;
      categorize the information;
      identify a geographic location associated with a client device;
      identify a privacy rule from a plurality of privacy rules based at least in part on the geographic location and the category of the information, wherein each of the privacy rules identifies an associated network routing scheme, and wherein the privacy rule is based at least in part on crowd sourced data obtained from a plurality of routers;
      determine how to route one or more messages in the first network communication based on the network routing scheme associated with the identified privacy rule;
      generate a second network communication including the one or more messages in accordance with the network routing scheme associated with the identified privacy rule; and
      cause the second network communication to be sent.

2. The system of claim 1, wherein the system comprises a router that routes the first network communication by generating and sending the second network communication.

3. The system of claim 1, wherein the system further comprises a storage device, and the plurality of privacy rules are stored on the storage device.

4. The system of claim 1, wherein the one or more processors further execute the instructions to:
   identify a category of website associated with the domain name or IP address; and
   identify the privacy rule based on the category of website.

5. The system of claim 1, wherein the privacy rule is identified based on the information relating to one or more of a port or protocol used by a client device in sending the first network communication.

6. The system of claim 1, wherein the privacy rule is configured by a user of a client device.

7. The system of claim 1, wherein the information indicates that a user of a client device wants to anonymize the second network communication.

8. The system of claim 1, wherein the second network communication is generated by encapsulating the one or more messages from the first network communication in one or more layers of encryption.

9. The system of claim 1, wherein the second network communication is:

routed via a first routing path comprising one or more computing devices, responsive to determining the privacy rule corresponds to a first rule; and routed via a second routing path comprising computing devices other than the one or more computing devices, responsive to determining the privacy rule corresponds to a first rule.

10. The system of claim 1, wherein the second network communication is generated for sending over a virtual private network (VPN).

11. A computer-implemented method for managing privacy of a network communication, the method comprising:
receiving a first network communication from a client device;
extracting information from the first network communication;
categorizing the information;
identifying a geographic location associated with a client device;
identifying, by one or more computer processors, a privacy rule from a plurality of privacy rules based at least in part on the geographic location and the category of the information, wherein each of the privacy rules identifies an associated routing scheme, and wherein the privacy rule is based at least in part on crowd sourced data obtained from a plurality of routers;
determining how to route one or more messages in the first network communication based on the network routing scheme associated with the identified privacy rule;
generating a second network communication including the one or more messages in accordance with the routing scheme associated with the identified privacy rule; and
sending the second network communication.

12. The method of claim 11, wherein the privacy rule is identified based on the information relating to a particular domain name or Internet Protocol (IP) address.

13. The method of claim 11, wherein the privacy rule is identified based on the information relating to a port used by the client device in sending the first network communication.

14. The method of claim 11, wherein the information indicates that the user of the client device wants to anonymize the second network communication.

15. The method of claim 11, wherein the second network communication is generated by encapsulating the one or more messages from the first network communication in one or more layers of encryption.

16. The method of claim 11, further comprising routing the second network communication via a:
first routing path comprising one or more computing devices, responsive to determining the privacy rule corresponds to a first rule; and
second routing path comprising computing devices other than the one or more computing devices, responsive to determining the privacy rule corresponds to a first rule.

17. The method of claim 12, further comprising:
identifying a category of website associated with the domain name or IP address; and
identifying the privacy rule based on the category of website.

18. A non-transitory computer-readable medium storing instructions that, when executed by one or more computer processors, cause the one or more computer processors to perform a method for managing privacy of a network communication, the method comprising:
receiving a first network communication from a client device;
extracting information from the first network communication;
categorizing the information;
identifying a geographic location associated with a client device;
identifying, by one or more computer processors, a privacy rule from a plurality of privacy rules based at least in part on the geographic location and the category of the information, wherein each of the privacy rules identifies an associated routing scheme;
determining how to route one or more messages in the first network communication based on the network routing scheme associated with the identified privacy rule;
generating a second network communication including the one or more messages in accordance with the routing scheme associated with the identified privacy rule; and
sending the second network communication;
wherein the privacy rule is based at least in part on crowd sourced data obtained from a plurality of routers.

19. The system of claim 1, wherein the crowd sourced data is obtained by a service provider which then conveys the privacy rule to one or more routers for automatic application to network communications.

* * * * *